Dec. 19, 1967  L. H. WILCOX  3,358,352
AXLE BEARING PULLER
Filed July 20, 1964  6 Sheets-Sheet 2

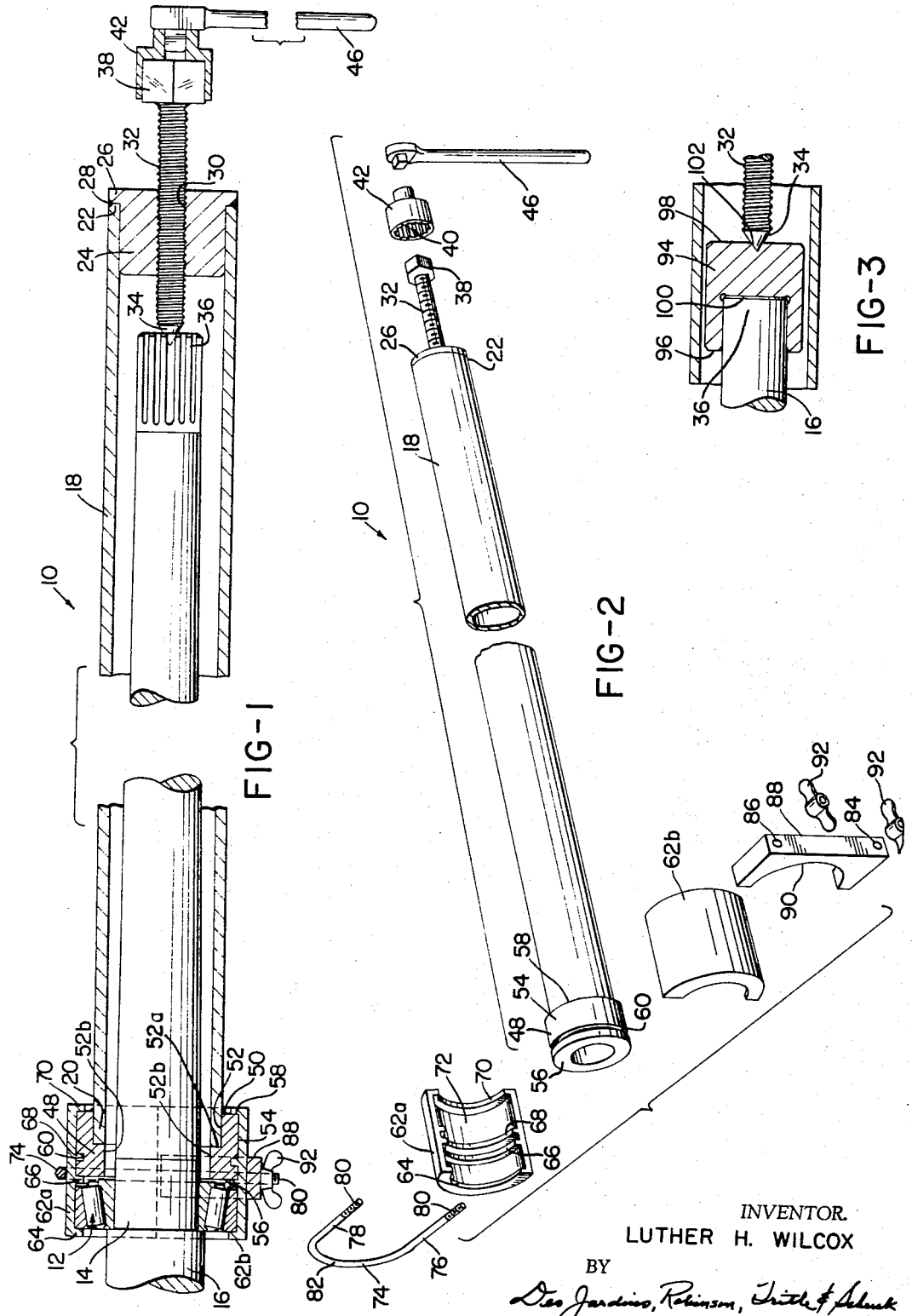

INVENTOR.
LUTHER H. WILCOX
BY
Des Jardins, Robinson, Litte & Schenk
ATTORNEYS

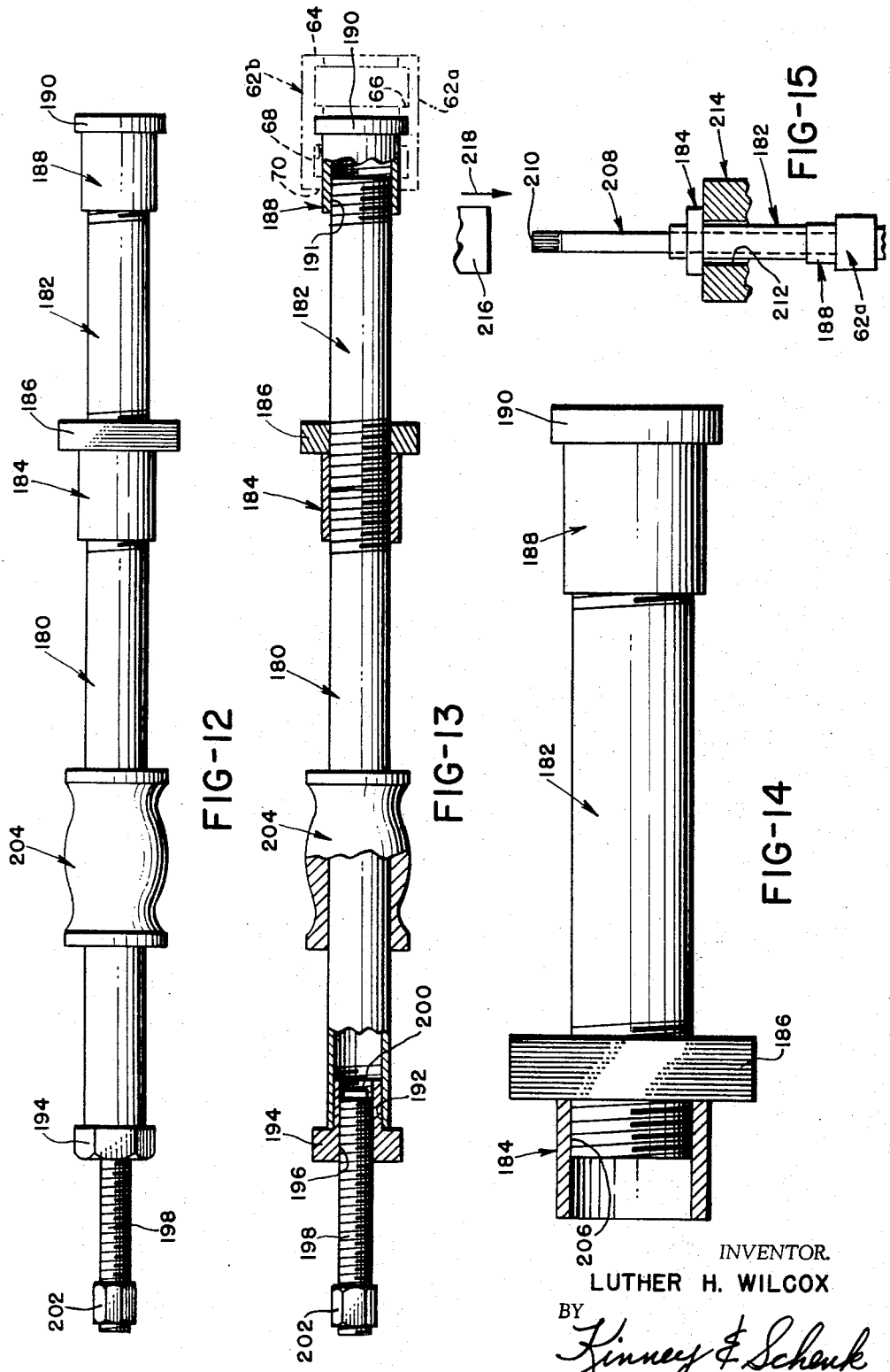

Dec. 19, 1967  L. H. WILCOX  3,358,352
AXLE BEARING PULLER

Filed July 20, 1964  6 Sheets-Sheet 4

INVENTOR.
LUTHER H. WILCOX
BY
*Kinney & Schenk*
ATTORNEYS

Dec. 19, 1967 L. H. WILCOX 3,358,352
AXLE BEARING PULLER
Filed July 20, 1964 6 Sheets-Sheet 5
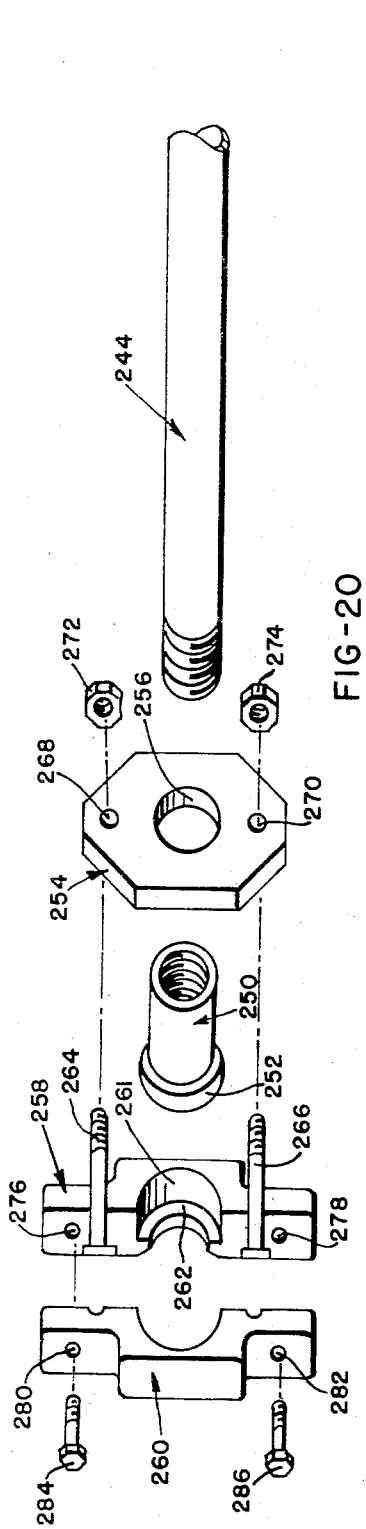
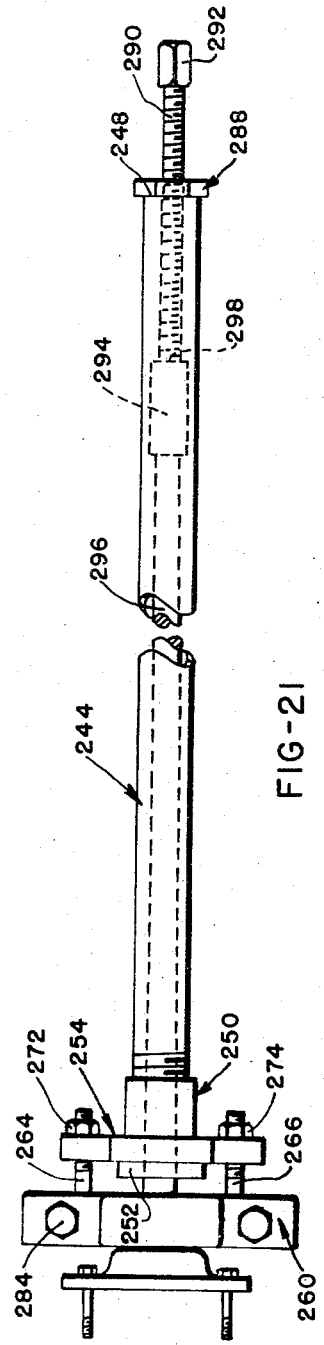
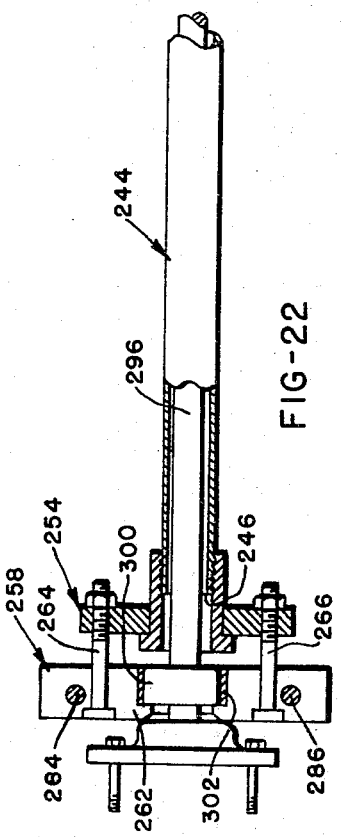
INVENTOR.
LUTHER H. WILCOX
BY *Kinney & Schenk.*
ATTORNEYS.

Dec. 19, 1967  L. H. WILCOX  3,358,352
AXLE BEARING PULLER
Filed July 20, 1964  6 Sheets-Sheet 6
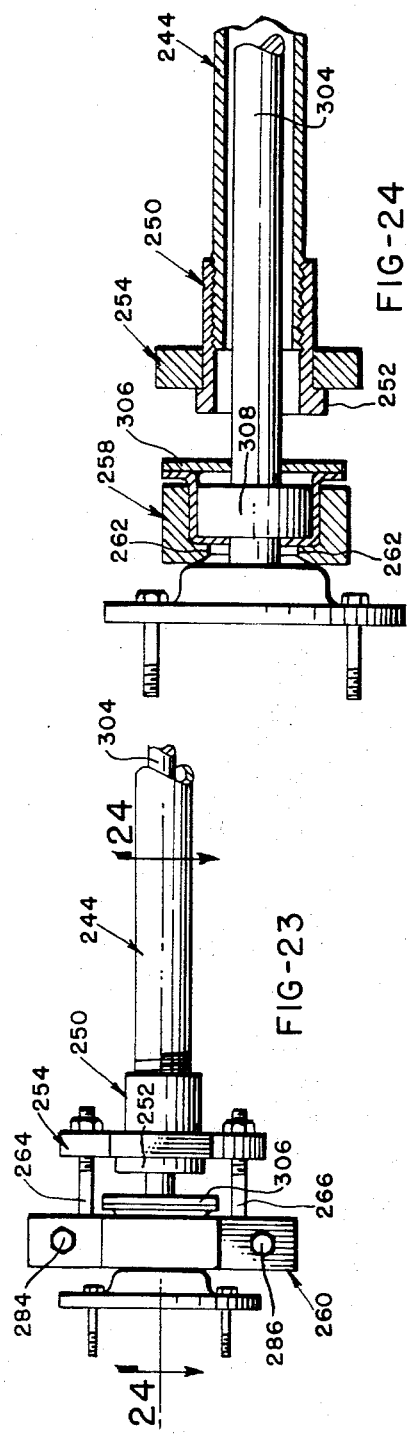
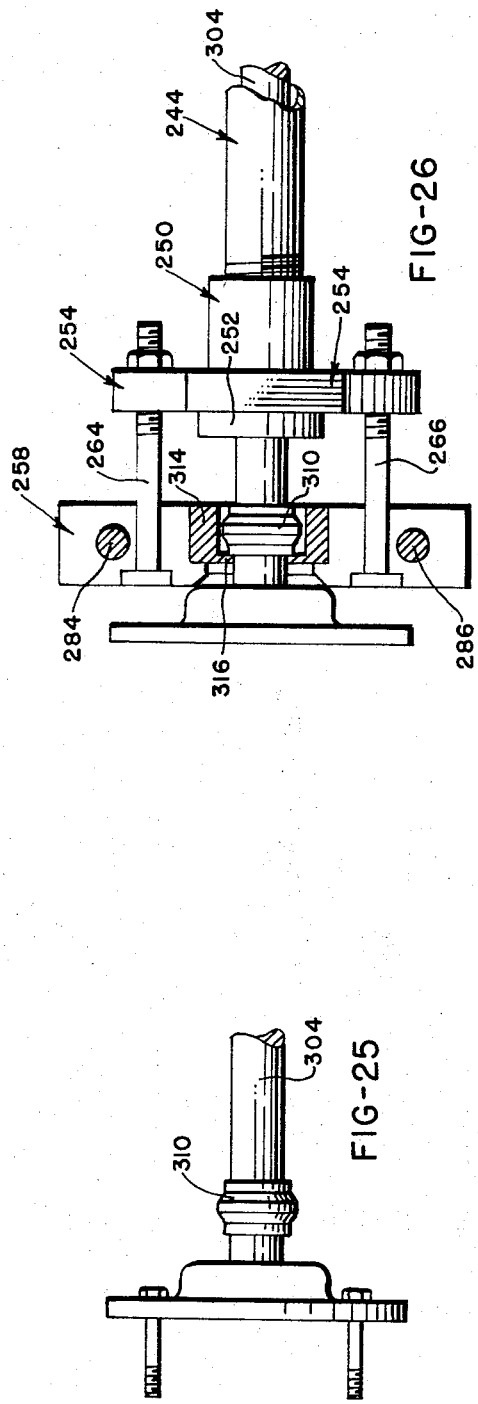
INVENTOR.
LUTHER H. WILCOX
BY *Kinney & Schenk*
ATTORNEYS 3,358,352
AXLE BEARING PULLER
Luther H. Wilcox, 517 Benson St.,
Reading, Ohio 45215
Filed July 20, 1964, Ser. No. 385,549
3 Claims. (Cl. 29—263)

ABSTRACT OF THE DISCLOSURE

The present disclosure relates to axle bearing pullers for motor vehicles whereby the main wheel bearing may be easily removed from the axle of the vehicle. The bearing puller comprises an elongated hollow housing having a pair of open ends, the housing is adapted to receive the bearing axle or shaft and means are provided to cooperate with the housing for engaging the bearings. The housing has additional means for applying pressure to the end of the axle whereby the bearing may be pulled off its seat on the axle.

---

This invention relates to an improved bearing puller or the like.

This is a continuation-in-part application of my co-pending application Ser. No. 99,628, filed Mar. 30, 1961, now abandoned.

It is well known in the art that it is rather difficult to remove damaged and worn out bearings from their respective seats on shafts and the like because the bearings have been originally press-fitted onto the shaft seats.

If one were to attempt to remove such bearings by hammering or the like, the bearing would become skewed and thereby score and damage the shaft during such removal operation.

Accordingly, various bearing pullers or the like have been designed to uniformly exert pressure throughout the entire bearing to tend to pull the bearing axially off of its respective shaft.

One such use of the aforementioned bearing pullers is to remove the main wheel bearings from the axles of vehicles and the like.

It has been found that it is a relatively simple operation to remove the axle from the vehicle whereby said removal operation can be accomplished in the field, if desired.

However, because the prior-known bearing pullers are rather complicated and bulky devices, they cannot be readily utilized in the field to subsequently remove the bearing from the vehicle axle so that the vehicle can be repaired in the field.

Thus, when prior-known devices were utilized, the removed vehicle axle had to be transported to a shop having a bearing puller so that the bearing could be subsequently removed and replaced. Thereafter, the repaired axle had to be transported back to the vehicle to be replaced therein.

Accordingly, it can be seen that the prior-known bearing pullers resulted in expensive repair bills because of the time lost in transporting such vehicle axles to a location having such a bearing puller.

Further, because such prior-known bearing pullers are rather large and complicated devices, the same are relatively expensive and require excessive maintenance whereby only a few repair shops can afford to have and maintain such devices. It has been found that it is more economical for a rather small filling station or repair shop to sublet any vehicle axle bearing job to a larger outfit than to maintain such prior-known bearing pullers.

However, according to the teachings of this invention, an improved bearing puller is provided that is relatively inexpensive to manufacture and substantially maintenance-free whereby even the smaller shop can readily afford to purchase the same.

Also, the bearing puller of this invention is relatively simple to operate and is relatively light in weight whereby the same can be readily utilized in the field for repair work to thereby cut the aforementioned repair costs.

In particular, one embodiment of the bearing puller of this invention comprises an elongated hollow housing having a pair of opposed open ends. An internally threaded insert is disposed in one of the open ends of the housing and threadedly receives a threaded shaft having one end thereof disposed in the hollow housing and the other end disposed outside the housing, the other end of the threaded shaft being so constructed and arranged that a conventional socket wrench or the like can be readily interconnected thereto to rotate the same relative to the housing and thereby cause axial movement between the threaded shaft and the housing.

A hollow holder or enlargement is secured to the other end of the hollow housing in aligned relation therewith and has an annular recess provided in the exterior surface thereof between the opposed ends thereof.

A pair of like bearing pulling members are adapted to be disposed on opposite sides of the holder and respectively have first flanges receivable in the annular groove of the holder to interconnect the pulling members therewith.

Each pulling member is provided with a second and third flange disposed respectively on each side of the first flange thereof and are adapted to respectively engage the opposed ends of the holder when the bearing pulling members are assembled thereto in the above manner.

Each pulling member is also provided with a fourth flange spaced from the second flange thereof and is adapted to be disposed spaced from the other end of the housing so that a bearing to be subsequently pulled from a shaft or the like can be disposed between the fourth flanges of the pulling members and the holder thereof.

When it is desired to pull a bearing from a shaft, such as a vehicle axle or the like, the bearing pulling members are disassembled from the housing and the end of the bearing shaft is inserted into the hollow housing through the opening in the holder thereof. The bearing shaft is so positioned relative to the housing that the bearing carried thereby is slightly spaced from the outer end of the holder.

Thereafter, the bearing pulling members are assembled to the holder in the above manner whereby the bearing is disposed between the second and fourth flanges of the bearing pulling members.

After the bearing pulling members have been so assembled to the holder, a clamping means is disposed around the bearing pulling members to hold the same in assembled relation with the holder.

Subsequently, the threaded shaft is turned by suitable means to axially move the threaded shaft toward the end of the axle disposed inside the housing. When the end of the threaded shaft makes contact with the end of the axle, further axial movement of the threaded shaft into the housing causes the bearing to be pulled off of its seat on the axle because the axle is pushed by the threaded shaft relative to the bearing.

In this manner, the bearing is uniformly pulled off of the axle so that scoring or damage thereto is eliminated.

If the axle is not long enough for the end of the threaded shaft to reach the same, an improved insert of this invention is provided which is adapted to be inserted between the ends of the axle and the threaded shaft in a manner hereinafter described to effectively lengthen the axle so that the bearing puller of this invention can readily remove the bearing in the above manner from the lengthened axle.

Thus, it can be seen that the bearing puller of this invention is relatively compact and simple to operate whereby the same can be inexpensively manufactured and be readily utilized in the field, if desired, features heretofore unattainable in the bearing removing art.

Another embodiment of the bearing pulling members that are adapted to pull bearings of different sizes by merely reversing the position of the bearing pulling in a manner hereinafter described and illustrated.

Also, another type of bearing pulling members is provided by this invention which is adapted to pull broken bearings from an axle or the like. For example, it may be found that when a bearing is being pulled from the axle, the outer race thereof is separated from the inner race whereby the inner race remains on the axle although the outer race and bearing elements have been removed. In this instance, the improved bearing pulling members of this invention can readily be utilized with the bearing puller of this invention to pull the inner race of the separated bearing from the axle or the like. In addition, the inner race pulling members are adapted to pull inner races of different sizes by merely reversing the position thereof on the holder of the bearing puller, as illustrated in the drawings.

Further, the inner peripheral surface of the non-bearing pulling end of the housing of the bearing puller can be internally threaded so that the threaded insert disposed therein can be readily removed.

In this manner, the bearing puller housing can be utilized for pulling the axles from vehicles and the like.

In particular, an improved axle puller is provided by this invention that has a plate portion adapted to be secured to the conventional hub bolts of a vehicle axle after the drum and hub have been removed therefrom. Thereafter, the internally threaded end of the bearing puller housing is telescoped over and threaded to an outwardly projecting hub of the axle puller so that the bearing puller housing can be utilized to pull the vehicle axle from the particular vehicle by lightly hitting a hammer or the like against a knocker sleeve previously telescoped over the bearing puller housing and abutting the holder thereof in a manner hereinafter described.

The axle puller of this invention has the hub thereof internally threaded to readily receive the threaded member of the bearing puller of this invention.

In this manner, the axle puller can be secured to the conventional hub bolts of a "Timken" axle and the threaded member of this invention can be utilized therewith to pull the drum and hub from the axle in a manner hereinafter described.

After the drum and hub have been pulled from the vehicle axle in the above manner, the housing of the bearing puller of this invention can be coupled to the free end of the vehicle axle by an adapter of this invention to pull the axle from the vehicle as previously described.

If the hub bolts of the vehicle axle are too short to permit the axle puller of this invention to be secured thereto, an adapter of this invention can be utilized in conjunction with the axle puller to readily permit such attachment as will be hereinafter described and illustrated.

Accordingly, it is an object of this invention to provide an improved bearing puller.

Another object of this invention is to provide an improved bearing puller that is inexpensive to manufacture, compact, and simple to operate.

Another object of this invention is to provide an improved bearing puller having means to adapt the same to shafts having varying lengths.

A further object of this invention is to provide improved bearing pulling members for such a bearing puller.

Another object of this invention is to provide an improved vehicle axle pulling device.

Another object of this invention is to provide an improved adapter for such an axle pulling member.

Other objects, uses and advantages of this invention are apparent upon a reading of this description, which proceeds with reference to the drawings forming a part thereof and wherein:

FIGURE 1 is an axial, cross-sectional view illustrating the improved bearing puller of this invention in one of its operating positions.

FIGURE 2 is an exploded, perspective view illustrating the various parts of the bearing puller of FIGURE 1.

FIGURE 3 is a fragmentary, axial, cross-sectional view illustrating the bearing puller of this invention utilizing a shaft-lengthening insert of this invention.

FIGURE 9 is a fragmentary, cross-sectional view illustrating the method of utilizing the housing of the bearing pulling member of FIGURE 6 to pull an axle from a vehicle or the like.

FIGURE 10 is a view similar to FIGURE 8 and illustrates another method of utilizing the vehicle-axle puller of FIGURE 7 in combination with the housing of the bearing pulling member of FIGURE 6 to pull an axle from a vehicle or the like.

FIGURE 12 is a side elevational view illustrating another modification of this invention.

FIGURE 13 is a partial axial, cross section view of the bearing puller of FIGURE 12.

FIGURE 14 is a side elevational view of a portion of the bearing puller of FIGURE 12 adapted for use with a press.

FIGURE 15 is a schematic view of the structure of FIGURE 14 in use with a press.

FIGURE 20 is an exploded, perspective view illustrating the various parts of another form of this invention.

FIGURE 21 is a side elevational view of the bearing puller of FIGURE 20 in an operating position with one type of axle structure.

FIGURE 22 is an axial, cross sectional view of a portion of FIGURE 21.

FIGURE 23 is a side elevational view illustrating the bearing puller of FIGURE 20 in one of its operating positions with another axle structure.

FIGURE 24 is a sectional view taken along the line 24—24 of FIGURE 23.

FIGURE 25 is a side elevational view of an axle having an inner race of a bearing disposed thereon.

FIGURE 26 is a side elevational view, partly in section, illustrating the use of the bearing puller of FIGURE 20 to remove the inner race of the bearing of FIGURE 25 from its axle.

Figure 4:
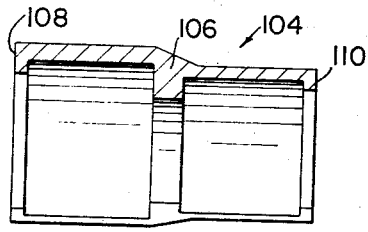
FIGURE 4 is an axial, cross-sectional view of another embodiment of a bearing pulling member of this invention.

While the various features of this invention are hereinafter described as being particularly adaptable for pulling bearings from the rear axle of vehicles or the like, it is to be understood that the various features of this invention can be utilized in forming bearing pullers from any type of shaft, as desired.

Therefore, this invention is not to be limited to only the application thereof illustrated in the drawings, as the drawings are merely utilized to illustrate one of the wide variety of uses of this invention.

Referring now to FIGURE 1, the improved bearing puller of this invention is generally indicated by the reference numeral 10 and is illustrated in one of its operating positions for pulling a bearing 12 off of its seat 14 on a rear axle 16 of a vehicle or the like in a manner hereinafter described.

As illustrated in FIGURES 1 and 2, the bearing puller 10 of this invention comprises an elongated hollow housing 18 having a pair of opposed open ends 20 and 22. While the housing 18 can be formed in any suitable manner and of any suitable material, it is preferred that the housing 18 be formed from a low carbon stainless steel or the like.

A metal insert or threaded member 24 is disposed in the open end 22 of the hollow housing 18 and has an enlarged end flange 26 welded or otherwise secured to the housing 18 at 28. The insert 24 has a threaded bore 30 passing concentrically therethrough and threadedly receives a threaded shaft 32 having one end 34 thereof adapted to abut an end 36 of the axle 16 in the manner illustrated in FIGURE 1. The other end 38 of the threaded shaft 32 comprises an enlarged nut or the like adapted to be telescopically received in a socket 40 of a socket wrench member 42 being adapted to be rotated by a suitable handle 46 detachably secured to the socket wrench member 42 in a manner well known in the art.

While the enlarged end 38 of the threaded shaft 32 is illustrated as having a hexagonal cross-sectional configuration, it is to be understood that the same could have desired cross-sectional configuration whereby the threaded shaft 32 can be rotated by any desired member, such as by the socket wrench member 42 or by a specially designed handle, if desired.

Although the metal insert 24 can be formed of any suitable material, it is preferred that the insert 24 be formed of hard steel or the like sufficient to withstand the various forces imposed thereon as hereinafter described.

A hollow enlargement or holder 48 is secured to the other end 20 of the hollow housing 18, such as by welding at 50.

While the holder 48 can be formed of any suitable material, the holder 48 is preferably formed from a relatively hard steel or the like and has a stepped bore 52 formed therein, the end 52a of the stepped bore 52 receiving the end 20 of the hollow housing 18 in the manner illustrated in FIGURE 1 with the end 52b of the stepped bore 52 being aligned with the bore passing through the housing 18.

The holder 48 is provided with a cylindrical outer surface 54 disposed between a pair of opposed, parallel ends 56 and 58 thereof.

An annular groove or recess 60 interrupts the outer cylindrical surface 54 of the holder 48 intermediate the ends 56 and 58 thereof for a purpose hereinafter described.

As illustrated in FIGURE 2, a pair of like bearing pulling members 62a and 62b are provided and each comprises a half of a hollow cylindrical structure provided with four spaced and parallel flanges 64, 66, 68, and 70 directed inwardly from the inner peripheral surface 72 thereof.

The flanges 64, 66, 68 and 70 are so constructed and arranged that the bearing pulling members 62a and 62b are adapted to be assembled to the holder 48 in the manner illustrated in FIGURE 1 whereby the flanges 68 of the bearing pulling members 62a and 62b are respectively received in the annular groove 60 of the holder 48 while the flanges 66 and 70 thereof respectively abut the end surfaces 56 and 58 of the holder 48. In this manner, the opposed bearing pulling members 62a and 62b are adapted to be assembled to the holder 48 of the bearing puller 10 on each side thereof and provide a substantially hollow cylindrical structure, the flanges 64 of the bearing pulling members 62a and 62b being spaced beyond the end surface 56 of the holder 48 in the manner illustrated in FIGURE 1 whereby the bearing 12 is adapted to be disposed between the flanges 64 and 66 of the bearing pulling members 62a and 62b for a purpose hereinafter described.

When the bearing pulling members 62a and 62b are assembled to the holder 48 of the bearing puller 10 in the above manner, the same are adapted to be held in assembled position with the holder 48 by having a suitable clamping device or the like secured around the exterior surface thereof.

In particular, as illustrated in FIGURE 2, the clamping device comprises a U-shaped member 74 having a pair of depending legs 76 and 78 respectively threaded at the free ends thereof at 80, the legs 76 and 78 being interconnected together by a semi-circular portion 82 of the U-shaped member 74.

The legs 76 and 78 of the U-shaped member 74 are adapted to be respectively received in bores 84 and 86 passing through a retainer 88 having a semi-circular cut-out portion 90 constructed to respectively engage the outer peripheral surface of the bearing pulling members 62a and 62b in the manner illustrated in FIGURE 1.

When the U-shaped member 74 is assembled to the retainer 88 around the bearing pulling members 62a and 62b in the manner illustrated in FIGURE 1, the free ends 80 of the legs 76 and 78 project beyond the retainer 88 and are adapted to be interconnected thereto by suitable nuts, such as the wing nuts 92 illustrated in the drawings.

The operation of the bearing puller 10 will now be described.

Assuming that the axle 16 carrying the bearing 12 has been removed from the rear of a vehicle or the like, and it is desired to remove the damaged or worn out bearing 12 therefrom, the bearing pulling members 62a and 62b and clamping device 74, 88 are removed from the housing 18 whereby the housing 18 can have the end 20 thereof telescoped over the end 36 of the axle 16 in the manner illustrated in FIGURE 1.

When the holder 48 of the housing 18 is properly positioned relative to the bearing 12 on the axle 16, the bearing pulling members 62a and 62b are assembled thereto in the above manner whereby the bearing 12 is disposed between the flanges 64 and 66 of the assembled bearing pulling members 62a and 62b in the manner illustrated in FIGURE 1.

Thereafter, the U-shaped member 74 of the clamping device is inserted around the bearing pulling members 62a and 62b and assembled to the retainer 88 in the above manner whereby the clamping device 74, 88 holds the bearing pulling members 62a and 62b in assembled relation with the holder 48.

After the bearing pulling members 62a and 62b have been assembled around the bearing 12 and secured to the holder 48 by the clamping device 74, 88, the threaded shaft 32 is rotated in any suitable manner to cause the end 34 thereof to be progressively inserted into the housing 18 until the same abuts the end 36 of the axle 16.

Further rotational movement of the threaded shaft 32 causes the threaded shaft 32 to be further inserted into the housing 18 and push the axle 16 to the left as illustrated in the drawings whereby the bearing 12 is prevented from being moved to the left with the axle 16 by the flanges 64 of the bearing pulling members 62a and 62b engaging against the bearing 12. Thus, as the axle 16 is moved to the left by the threaded shaft 32, bearing 12 is progressively moved off of its bearing seat 14.

When the axle 16 has been shifted to the left a sufficient distance by the threaded shaft 32, the bearing 12 will have been completely removed from its bearing seat 14 whereby the bearing can be readily telescoped off the remainder of the axle 16 by hand because the axle tapers downwardly from the bearing seat 14 to the end 36 thereof.

Thus, it can be seen that the bearing 12 is adapted to be pulled off of the bearing seat 14 of the axle 16 in a relatively simple manner by merely rotating the threaded shaft 32 in the desired direction by any suitable wrench or the like. Because the threaded shaft 32 causes longitudinal axial movement of the axle 16 relative to the bearing 12, no scoring or damage is caused to the bearing seat 14 of the axle 16 during the bearing removal operation so that a new bearing can be replaced on the axle 16 without remachining the axle 16.

After the bearing 12 has been removed from the bearing seat 14 of the axle 16 in the above manner, the clamping device 74, 88 is disconnected from the bearing pulling members 62a and 62b so that the bearing pulling members 62a and 62b can be removed from the holder 48. Thereafter, the housing 18 is taken off of the axle 16 whereby the bearing 12 can be removed from the axle 16 by a simple hand operation.

Should it be found that the length of the axle 16 is not sufficient to have the end 36 thereof reach the end 34 of the threaded shaft 32 when the bearing 12 is disposed in the bearing pulling members 62a and 62b as illustrated in FIGURE 1, an insert 94, FIGURE 3, is provided and comprises a substantially cylindrical structure having a pair of opposed ends 96 and 98 respectively interrupted by recesses 100 and 102 to respectively receive the ends 36 and 34 of the axle 16 and threaded shaft 32.

In this manner, before the housing 18 is assembled to the short axle 16, the insert 94 can be telescoped over the end 36 of the axle 16 in the manner illustrated in FIGURE 3 whereby the assembled insert 94 and axle 16 is subsequently inserted into the housing 18 of the bearing puller 10. Thus, the insert 94 effectively lengthens the axle 16 so that the threaded shaft 32 can perform its bearing removing function in the above manner by having the end 34 thereof bear against the end 98 of the insert 94.

By providing the recess 100 in the insert 94, the insert 94 can be maintained on the end 36 of the axle 16 during the telescoping relation of the housing 18 over the end 36 of the axle 16 as is apparent.

Therefore, it can be seen that the bearing puller 10 of this invention provides a very compact structure which can be inexpensively manufactured and can be readily utilized in the field because the same is not bulky and does not have complicated parts.

Further, the bearing puller 10 of this invention is adapted to remove bearings from axles having various lengths because of the novel insert 94 provided therefor.

Another bearing pulling member 104 of this invention is illustrated in cross-section in FIGURE 4 and is adapted to be combined with two other like members 104 to encompass the holder 48 of the bearing puller 10 to pull bearings in a manner similar to the bearing pulling members 62a and 62b previously described.

In particular, each bearing pulling member 104 has an inwardly directed central flange 106 adapted to be received in the groove 60 of the holder 48 of the bearing puller 10 to interconnect the bearing pulling members 104 thereto, the members 104 being retained on the holder 48 by a suitable clamping device in the same manner as the members 62a and 62b. A pair of outer, inwardly directed flanges 108 and 110 are carried by each bearing pulling member 104 and are respectively spaced on opposite sides of the central flange 106 thereof.

The flange 110 projects inwardly a greater distance than the flange 108 of each bearing pulling member 104, so that the bearing pulling members 104 are adapted to pull bearings of different sizes from a shaft or the like.

In particular, the bearing pulling members 104 can be assembled to the holder 48 of the bearing puller 10 with the central flanges 106 thereof received in the groove 60 of the holder 48 and with the flanges 108 thereof projecting beyond the free end 56 of the holder 48 to encompass a bearing disposed between the flanges 108 and the free end 56 of the holder 48.

If it is desired to pull a smaller bearing from a shaft or the like, the bearing pulling members 104 are reassembled to the holder 48 of the bearing puller 10 in such a manner that the flanges 110 thereof project beyond the free end 56 of the holder 48 rather than the flanges 108.

In this manner, the flanges 110 project radially inwardly a greater distance than the flanges 108 and thereby are adapted to grasp a smaller bearing disposed between the flanges 110 and the free end 56 of the holder 48.

Thus, it can be seen that the bearing pulling members 104 are adapted to pull bearings of different sizes from a shaft or the like in substantially the same manner as the bearing pulling members 62a and 62b previously described, except that the bearing pulling members 104 are adapted to be adjusted to different positions on the holder 48 to pull bearings of different sizes.

Sometimes it has been found that when a bearing is being pulled from a vehicle axle or the like, the outer race of the bearing becomes separated from the inner race thereof, whereby the inner race of the bearing remains on the vehicle axle.

Accordingly, other bearing pulling members of this invention can be utilized in combination with the bearing puller 10 to readily remove the inner races of bearings disposed on vehicle axles and the like.

Figure 5:
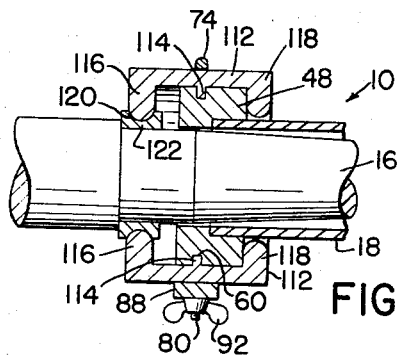
FIGURE 5 is a fragmentary, axial, cross-sectional view similar to the left-hand end of FIGURE 1, illustrating another embodiment of this invention.

In particular, attention is directed to FIGURE 5 wherein a plurality of bearing pulling members 112 are secured to the holder 48 of the bearing puller 10.

Two or more, and preferably three, bearing pulling members 112 are utilized and each has a central, inwardly directed flange 114 received in the groove 60 of the holder 48 of the bearing puller 10 to interconnect the member 112 thereto.

Each bearing pulling member 112 has a pair of outer, radially, inwardly directed flanges 116 and 118 spaced outwardly from the opposite sides of the central flange 114 in the same manner as the flanges 108 and 110 of the bearing pulling member 104 of FIGURE 4.

The flange 116 of each bearing pulling member 112 is disposed inwardly a greater distance than the flange 118 thereof whereby the bearing pulling members 112 are adapted to pull inner races of bearings of different sizes in the same manner that the bearing pulling members 104 are adapted to pull bearings of different sizes.

The inner free edges of the flanges 116 and 118 of the bearing pulling members 112 are arcuate, so that the same are adapted to be received in the ball bearing groove 120 of the inner race 122 of the bearing or the like disposed on the shaft 16 in the manner illustrated in FIGURE 5.

In this manner, the bearing pulling members 112 can be utilized to remove inner races of bearings and the like after the outer races have been removed by the other bearing pulling members of this invention or the like.

Figure 6:
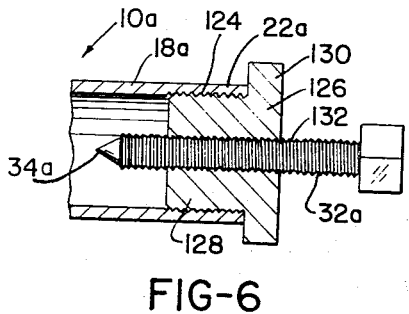
FIGURE 6 is a fragmentary, axial, cross-sectional view similar to the right-hand end of FIGURE 1, illustrating another embodiment of this invention.

While the threaded insert 24 of FIGURE 1 is illustrated as being welded to the end 22 of the hollow housing 18 of the bearing puller 10, the threaded insert 24 could be threadedly secured thereto in the manner illustrated in FIGURE 6 so as to be readily removed when desired.

In particular, attention is directed to FIGURE 6 wherein the internal surface of the end 22a of the hollow housing 18a of the bearing puller 10a is internally threaded at 124 to threadedly receive a threaded insert 126 having an externally threaded portion 128 adapted to be received in the open end 22a of the hollow housing 18a.

A collar 130 extends from one end of the insert 126 and is adapted to abut the open end 22a of the hollow housing 18a when the insert 126 has been fully threaded therein in the manner illustrated in FIGURE 6.

The threaded insert 126, in a manner similar to the insert 24 previously described, has a threaded bore 132 passing therethrough adapted to threadedly receive the threaded shaft or member 32a in the manner and for the purpose previously described.

The internally threaded housing 18a of FIGURE 6 is adapted to be utilized in combination with other devices of this invention to pull vehicle axles from vehicles or the like in a manner hereinafter described, because the insert 126 can be readily removed therefrom by merely backing off the insert 126 from the hollow housing 18a.

Figures 7, 8:
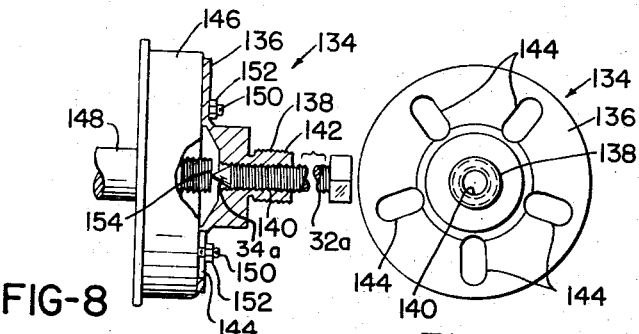
FIGURE 7 is a front view of a vehicle-axle puller of this invention.
FIGURE 8 is a fragmentary, schematic view illustrating one method of utilizing the axle puller of FIGURE 7 to pull a drum and hub from a vehicle axle.

One such device is illustrated in FIGURES 7 and 8 and is generally indicated by the reference numeral 134. While the device 134 is hereinafter described as an axle puller, the same is adapted to be utilized for many other purposes, such as pulling a drum and hub from a vehicle axle as illustrated in FIGURE 8.

The axle puller 134 comprises a circular plate-like member 136 having a central hub 138 projecting outwardly from one side thereof. A bore 140 passes centrally through the hub 138 and is internally threaded to receive the threaded member 32 or 32a previously described for a purpose hereinafter described.

Figure 10:
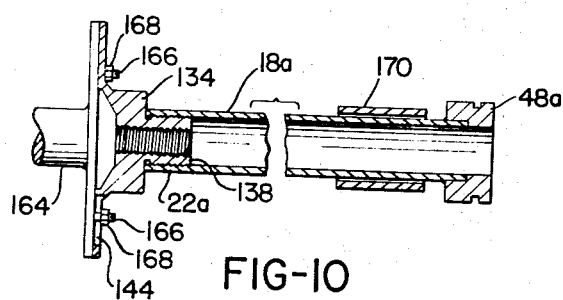
Figure 16:
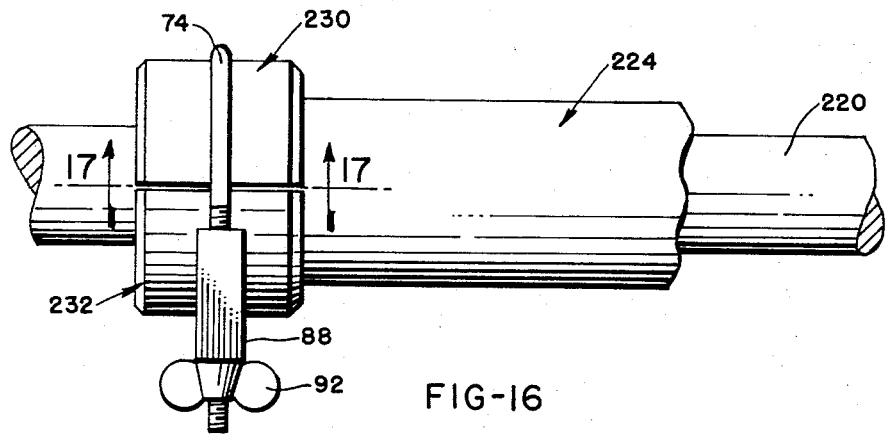
FIGURE 16 is a side elevational view of another form of this invention.

The external surface of the hub 138 is threaded at 142 and is so constructed and arranged that the threaded end 22a of the housing 18a of the bearing puller 10a is adapted to be threaded on the hub 138 in a manner hereinafter described and for a purpose hereinafter described as illustrated in FIGURE 10.

A plurality of slots 144 pass transversely through the plate-like member 136 of the axle puller 134 and are radially disposed and equally spaced about the central hub 138.

The slots 144 are so constructed and arranged in the axle puller 134 that the same are adapted to respectively receive the five conventional hub bolts projecting from a wheel axle and normally utilized to hold the rim of a wheel thereon.

The slots 144 are radially disposed relative to the hub 138 so that the axle puller 134 is adapted to be utilized on axles of varying sizes, as is apparent.

The method of utilizing the axle puller 134 on a conventional "Timken" type of rear axle will now be described and reference is made to FIGURE 8.

As illustrated in FIGURE 8, the axle puller 134 is adapted to be secured to the drum 146 of a "Timken" type axle 148 by receiving the conventional hub bolts 150 through the slots 144 thereof and being secured thereto by nuts 152.

After the axle puller 134 has been secured to the drum 146 of the axle 148, the threaded member 32 or 32a of the bearing puller 10 or 10a is removed therefrom and threaded into the bore 140 of the axle puller 134, as illustrated in FIGURE 8. By rotating the threaded member 32a in the proper direction to cause the end 34a thereof to abut against the end 154 of the axle 148, further rotation of the member 32 or 32a into the hub 138 of the axle puller 134 causes the drum 146 to be backed off of the axle 148.

Figure 9:
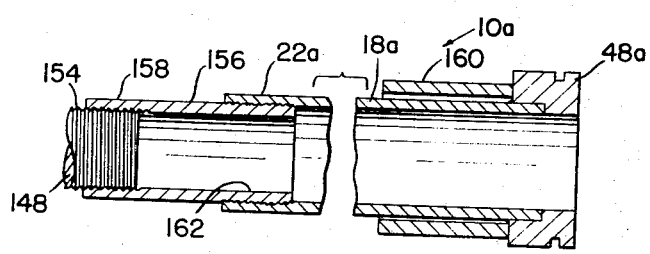

After the drum 146 has been removed from the axle 148 by the axle puller 134 in the above manner, the axle 148 can be removed from the vehicle in the manner illustrated in FIGURE 9.

In particular, a hollow, pipe-like adapter 156 has one end 158 thereof threadedly disposed on the threaded end 154 of the axle 148.

Thereafter, the threaded insert 126 of the bearing puller 10a is removed from the housing 18a thereof and a sleeve or knocker 160 is telescoped over the end 22a of the housing 18a of the bearing puller 10a in the manner illustrated in FIGURE 9 whereby the knocker 160 is adapted to abut the holder 48a of the bearing puller 10a.

Subsequently, the threaded end 22a of the housing 18a is telescoped on to the externally threaded end 162 of the adapter 156 whereby the housing 18a is effectively interconnected to the axle 148.

Thereafter the axle 148 is removed from the vehicle by knocking the sleeve 160 against the holder 48a of the bearing puller 10a by either utilizing a hammer or by sliding the sleeve 160 against the holder 48a in a series of light impacts.

In this manner, the axle 148 can be readily removed from the vehicle after the axle puller 134 has removed the drum 146 therefrom.

In other types of vehicle axles, the drum is readily removed by hand without requiring the use of the axle puller 134 in the manner illustrated in FIGURE 8.

Thus, the conventional hub bolts can be utilized to remove the vehicle axle from the vehicle in the manner illustrated in FIGURE 10.

In particular, the axle puller 134 is adapted to be secured to the conventional axle 164 by the conventional hub bolts and nuts 168 in the manner previously described with regard to FIGURE 8.

After the axle puller 134 is secured to the axle 164, the threaded insert 126 is removed from the hollow housing 18a of the bearing puller 10a and a sleeve or knocker 170 is telescoped over the housing 18a and disposed adjacent the holder 48a thereof as illustrated in FIGURE 10.

Thereafter, the threaded end 22a of the housing 18a is telescoped over and threadedly secured to the hub 138 of the axle puller 134 in the manner illustrated in FIGURE 10 whereby the axle 164 can be removed from the vehicle by lightly rapping the sleeve or knocker 170 against the holder 48a by hand or by a hammer.

Therefore, it can be seen that the axle puller 134 of this invention is adapted to be utilized in combination with the bearing puller 10a of this invention to readily remove the axle 164 from the vehicle or the like and that the bearing puller 10a can, thereafter, be utilized to remove the bearing from the axle 164 in any of the manners previously described.

Sometimes, it has been found that the conventional hub bolts of vehicle axles are not long enough to readily permit the axle puller 134 to be secured thereto in the above manner.

Figure 11:
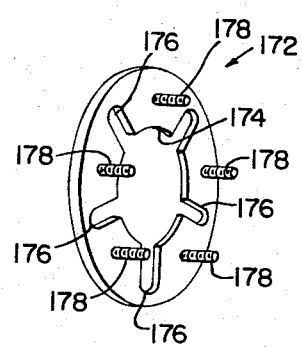
FIGURE 11 is a perspective view illustrating an adaptor of this invention to be utilized in combination with the vehicle-axle puller of FIGURE 7.

Accordingly, an adapter 172 of this invention, illustrated in FIGURE 11, is provided to be utilized in conjunction with the axle puller 134 in a manner hereinafter described.

The adapter 172 comprises a flat plate-like structure having a central aperture or opening 174 passing centrally therethrough to readily receive the projecting portions of axles or the like.

A plurality of radially disposed slots 176 are formed in the adapter 172 and are interconnected with the central aperture 174 as illustrated in FIGURE 11, the slots 176 permitting the adapter 172 to be utilized on vehicle axles of varying sizes in the same manner that the axle puller 134 is utilized.

The slots 176 are so constructed and arranged that the same are adapted to receive the conventional hub bolts of vehicle axles and the like so that the adapter 172 can be secured thereto by the hub bolts in an effective and simple manner.

A plurality of threaded bolts or members 178 project outwardly from one side of the adapter 172 and are adapted to be respectively received in the slots 144 of the axle puller 134.

Therefore, it can be seen that the adapter 172 can be attached to the vehicle axle by the conventional hub bolts thereof and, thereafter, be secured to the axle puller 134 through the threaded members 178 thereof. After the axle puller 134 has been secured to the adapter 172, the axle of the vehicle can be removed by the bearing puller 10a or the hub and drum of the axle can be removed by the threaded member 32 or 32a in the manner preciously described.

A type of bearing puller, which may be utilized either for portable use as is the bearing puller of FIGURE 1, for example, or in an arbor press, is shown in FIGURES 12–15. The bearing puller comprises an elongated hollow housing formed of two cylindrical members 180 and 182 removably joined together by an annular member 184 having an enlarged shoulder 186 on one end thereof.

The exterior of the cylindrical member 180 is threaded on one end for cooperation with threads on the interior of the annular member 184. The exterior of the cylindrical member 182 is threaded on both of its ends with one of the ends cooperating with the threads on the interior of the annular member 184.

As shown in FIGURES 12 and 13, the bearing puller is assembled for portable use. The cylindrical member 182 has an annular member 188, which is interiorly threaded, attached to its end remote from the annular member 184 by cooperation with the other exterior threaded end of the cylindrical member 182. The annular member 188 has an enlarged shoulder 190 at its end, which is remote from the cylindrical member 182. Thus, an elongated hollow housing with opposed open ends 191 and 192 is formed with an enlargement at the open end 191.

When removing a bearing from an axle of the type disclosed in FIGURE 1, for example, the shoulder 190 is positioned adjacent the bearing, which is to be removed, in the same manner as the holder 48 is positioned in FIGURE 1.

The pair of like bearing pulling members 62a and 62b (shown in phantom in FIGURE 13) is interconnected with the elongated hollow housing by having the flanges 66 and 68 of the members 62a and 62b fit on opposite sides of the shoulder 190. The bearing would be disposed between the flanges 64 and 66 of the members 62a and 62b in the same manner as described with respect to FIGURE 1. The pulling members 62a and 62b are retained in position by a suitable clamping device such as the U-shaped member 74, the retainer 88, and the wing nuts 92 of FIGURES 1 and 2. It should be understood that other bearing pulling members such as the bearing pulling member 104 of FIGURE 4, for example, may be utilized rather than the bearing pulling members 62a and 62b if desired.

The open end 192 of the elongated hollow housing, which is formed by the cylindrical members 180 and 182, has a metal insert or threaded member 194 disposed therein. The insert 194 has a threaded bore 196 passing concentrically therethrough and threadedly receiving a threaded shaft 198 having one end 200 adapted to abut against an end of an axle, which will be disposed within the cylindrical members 180 and 182, in the same manner as illustrated in FIGURE 1.

The threaded shaft 198 has its other end 202 formed as an enlarged nut or the like to be telescopically received in a socket of a tool such as the socket 40 of the socket wrench member 42 of FIGURE 1. While the enlarged end 202 of the shaft 198 is illustrated as having a hexagonal cross-sectional configuration, it should be understood that it may have any other cross-sectional configuration whereby the threaded shaft 198 may be rotated by other suitable tools than the socket wrench member 42.

The operation of the bearing puller of FIGURES 12 and 13 is the same as that described for the structure of FIGURE 1 so that it will not be described further. It should be understood that the insert 94 of FIGURE 3 could be employed between the end 200 of the threaded shaft 198 and the the end of the axle, remote from the bearing, if the length of the axis is not sufficient to permit the end 200 of the threaded shaft 198 to reach it to produce relative movement between the housing and the axle.

A sleeve or knocker 204 is telescoped over the cylindrical member 180 in FIGURES 12 and 13. The sleeve or knocker 204 would be utilized whenever the bearing puller is employed to pull an axle from a vehicle or the like as illustrated in FIGURES 9 and 10 with respect to other bearing pullers. The sleeve 204 is slid along the cylindrical member 180 against the annular member 184 in a series of light impacts to remove the axle from the vehicle. It will be understood that the open end 192 of the cylindrical member 180 is the portion of the elongated hollow housing attached to the axle or an adapter. Of course, the threaded insert 194 and the threaded shaft 198 have been removed from the open end 192.

If the bearing on the axle must be removed by an arbor press because of being press fitted on the axle or it is desired to utilize an arbor press rather than the threaded shaft 198, then the cylindrical members 180 and 182 are disconnected and the cylindrical member 182 forms the elongated hollow housing as shown in FIGURE 14. The second open end of the elongated hollow housing of FIGURE 14 is formed by the open end 206 of the cylindrical member 182.

In order to dispose an axle 208 (see FIGURE 15) within the cylindrical member 182, the annular member 188 is passed over one end (see FIGURE 15) of the axle 208. The end 210 is remote from the end of the axle 208 having the bearing seated thereon. The annular member 188 is moved downwardly until the shoulder 190 is disposed adjacent a bearing (not shown) on the axle 208 which would appear similar to bearing 12 on axle 16 as shown in FIGURE 1.

The bearing pulling members 62a and 62b (one shown in FIGURE 15) are then attached to the shoulder 190 and held thereon by a clamping device such as described with respect to FIGURE 13. In order to position the cylindrical member 182 and the axle 208 within a bore 212 of a fixed portion 214 of an arbor press, it is necessary to have the annular member 184 removed from the cylindrical member 182. The axle 208 and the cylindrical member 182 are next inserted from the bottom of the fixed portion 214 upwardly into the bore 212 to the position shown in FIGURE 15.

The annular member 184 is then passed over the end 210 of the axle 208 and threadedly connected with the exteriorly threaded end of the cylindrical member 182. This locks the cylindrical member 182, the annular member 188, and the bearing pulling members 62a and 62b to prevent them from moving with respect to the fixed portion 214.

When a moving portion 216 of the arbor press is moved in the direction of the arrow 218, the moving portion 216 engages the end 210 of the axle 208 to produce relative movement of the elongated hollow housing, which is the cylindrical member 182, and the axle 208 whereby the bearing (not shown) is removed from its seat on the axle 208.

Thus, the bearing puller of FIGURES 12–15 is not only adaptable for use in portable situations to remove a bearing from an axle but also may be employed to remove a bearing from an axle through the use of a press. Additionally, the bearing puller of FIGURES 12–15 may be utilized to remove axles from the vehicle.

Figure 17:
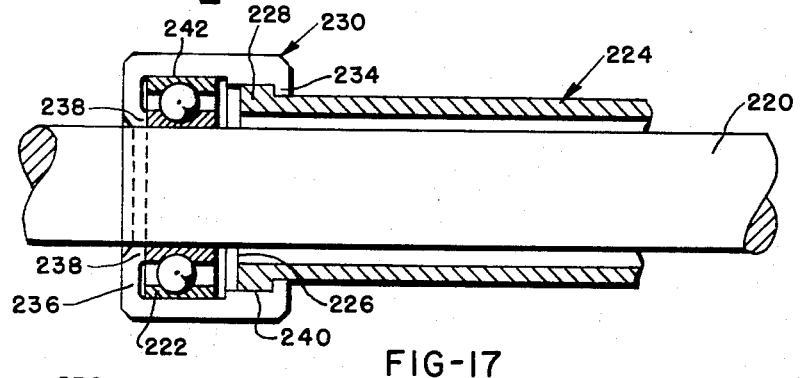
FIGURE 17 is a sectional view of the bearing puller of FIGURE 16 and taken along the line 17—17 of FIGURE 16.
Figure 18:
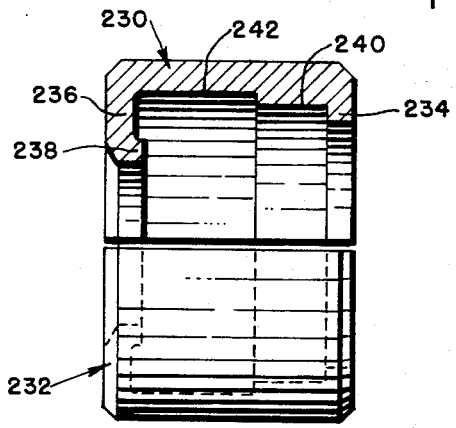
FIGURE 18 is a side elevational view, partly in section, of the pulling members of FIGURE 16.
Figure 19:
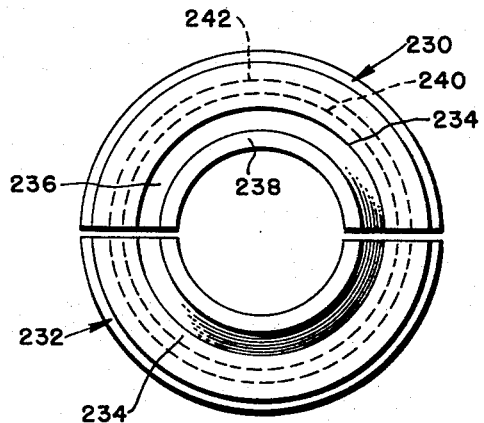
FIGURE 19 is an end elevational view of the pulling members of FIGURE 18.

Another form of bearing puller is shown in FIGURES 16–19. This bearing puller is employed to remove the bearing from the rear axle of all Chevrolets beginning with the 1957 model. As shown in FIGURE 17, an axle 220 has a bearing 222 thereon. It should be observed that the bearing 12 is mounted with respect to the shoulder of the rear axle 16 (see FIGURE 1).

The bearing puller includes an elongated hollow housing 224 having a pair of opposed open ends (one shown at 226). The other end of the elongated hollow housing 224 may be constructed as shown in FIGURE 1 and is not shown in FIGURES 16–19. The elongated hollow housing 224 has an enlarged shoulder 228 at the open end 226.

A pair of like bearing pulling members 230 and 232 is adapted to be interconnected with the housing 224 through cooperation of flanges 234 abutting against the shoulder 228 (see FIGURE 17). As disclosed in FIGURES 17 and 18, the bearing pulling members 230 and 232 have flanges 236 on the end remote from the end having the flanges 234. The flanges 236 define a smaller diameter than the diameter defined by the flanges 234 when the bearing pulling members 230 and 232 are interconnected with the hollow housing 224. The flanges 236 have an abutment 238 for engagement with the inner race of the bearing 222 (see FIGURE 17).

The bearing pulling members 230 and 232 have first portions 240, which are adjacent to the flanges 234 and define a greater diameter than the diameter defined by the flanges 234. As shown in FIGURE 17, the first portions 240 of the members 230 and 232 contact the outer surface of the shoulder 228. Each of the bearing pulling members 230 and 232 has a second portion 242 cooperating to define a greater diameter than the diameter defined by the first portion 240 when the bearing pulling members 230 and 232 are interconnected to the hollow housing 224. The second portions 242 of the members 230 and 232 rests against the outer race of the bearing 222. Thus, the bearing pulling members 230 and 232 are in contact with the shoulder 228 of the housing 224, the axle 220 through the flanges 236, the outer race of the bearing 222, and the inner race of the bearing 222.

The bearing pulling members 230 and 232, which form a hollow cylindrical structure, are interconnected with the hollow housing 224 by a suitable clamping device. The clamping device of FIGURE 1, which comprises the U-shaped member 74, the retainer 88, and the wing nuts 92, is preferably employed. If desired, other suitable clamping devices may be used.

When it is desired to remove a bearing from a rear axle of a Chevrolet of a 1957 model or later, the elongated hollow housing 224 is telescoped over the end of the axle 220 remote from the bearing 222. The bearing pulling members 230 and 232 are then positioned over the shoulder 228 and the bearing 222 so that the abutments 238 of the flanges 236 of the members 230 and 232 contact the inner race of the bearing 222. With this relation, the flanges 234 of the members 230 and 232 abut against the shoulder 228 of the housing 224. The pulling members 230 and 232 are then clamped into position to encompass the bearing 222.

Relative movement of the housing 224 with respect to the axle 220 is accomplished by suitable means such as the threaded member 24 and the threaded shaft 32 of FIGURE 1, for example, disposed in the other open end of the housing 224. The relative movement between the axis 220 and the housing 224 results in the bearing 222 being removed from the axle 220.

Another bearing puller, which is designed for use with U.S. compact cars, is disclosed in FIGURES 20–26. As shown in FIGURE 20, the bearing puller comprises an elongated hollow housing 244 having a pair of opposed open ends 246 and 248. The housing 244 is externally threaded adjacent the open end 246 and internally threaded adjacent the open end 248.

An annular member 250 having an enlarged shoulder 252 at one end is internally threaded for cooperation with the external threads on the housing 244. The enlarged shoulder 252 cooperates with an octagonal shaped flange member 254, which forms part of an adapter, to permit use of the bearing puller with U.S. compact cars. The member 254 has an opening 256 to permit the member 254 to slide over the housing 244 and the annular member 250 so that the member 254 may abut against the shoulder 252 of the annular member 250.

A pair of like bearing pulling members 258 and 260 is adapted to fit around bearings on the rear axles of U.S. compact cars. Each of the bearing pulling members 258 and 260 has a semi-cylindrical passage 261 extending therethrough with a flange 262 at one end. The flanges 262 define a smaller diameter than the diameter of the passages 261.

The members 258 and 260 have cooperating slots or recesses for reception of bolts 264 and 266, which are preferably welded to the member 258. The bolts 264 and 266 pass through openings 268 and 270, respectively, in the member 254 to connect the bearing pulling members 258 and 260 to the member 254 through the use of nuts 272 and 274, respectively.

Before the bearing pulling members 258 and 260 can be attached to the member 254 by the bolts 264 and 266, it is necessary that the bearing pulling members 258 and 260 be secured to each other. The bearing pulling member 258 has bores 276 and 278 extending therethrough. These bores 276 and 278 are aligned with bores 280 and 282, respectively, in the bearing pulling member 260.

The aligned bores 276 and 280 receive a bolt 284, which has a cooperating nut (not shown) for connecting the bearing pulling members 258 and 260 together. The second bolt 286 passes through the aligned bores 278 and 282 to also connect the bearing pulling members 258 and 260 together. A nut (not shown) secures the bolt 286 in position. With the bearing pulling members 258 and 260 attached to the member 254, the complete adapter is formed.

As shown in FIGURE 21, the open end 248 of the housing 244 has a threaded member 288 inserted therein. The threaded member 288 has a threaded shaft 290 passing therethrough in the same manner as described with respect to the threaded member 24 and the threaded shaft 32 of FIGURE 1. The threaded shaft 290 has an enlarged nut 292 or the like at one end for reception of a tool such as the socket wrench 42, for example.

As shown in FIGURE 21, an insert 294 is disposed within the housing 244 between an axle 296 and the other end 298 of the threaded shaft 290. If the length of the axle 296 is sufficient to permit the end 298 of the threaded shaft 290 to reach the end of the axle 296, the insert 294 need not be employed.

The axle 296 has a bearing 300 seated thereon in the manner employed in the Ford Falcon and some other U.S. compacts. The member 254 is placed adjacent the shoulder 252 of the annular member 250 prior to the housing 244 being telescoped over the end of the axle 296 remote from the bearing 300. The bearing pulling members 258 and 260 are then placed about the bearing 300 and secured together by the bolts 284 and 286 with the flanges 262 engaging against the bearing 300 on the side remote from the housing 244 (see FIGURE 22).

An annular spacer 302, which was fitted around the bearing 300 prior to the telescoping of the housing 244 over the axle 296, is aligned so that it is centered with respect to the bearing 300 and the bearing pulling members 258 and 260 after the members 258 and 260 are bolted together. The spacer 302 is completely disconnected at one point (not shown) to permit the desired relationship.

The members 258 and 260 are attached to the member 254 by the bolts 264 and 266. The flanges 262 are drawn snug against one end of the bearing 300 and the member 254 abuts against the shoulder 252 of the annular member 250 to provide a unitary adapter.

Relative movement between the axle 296 and the housing 244 is created by movement of the threaded shaft 290 through grasping of the enlarged nut 292 by a suitable tool. This relative movement results in removal of the bearing 300 from the axle 296.

In FIGURES 23 and 24, the bearing puller of FIGURE 20 is shown in use with a rear axle 304, which is utilized in the Corvair. A flanged housing 306 encloses the bearing 308, which is mounted on the rear axle 304.

In the operation of removing the bearing 308 and its flanged housing 306 from the rear axle 304, the housing 244 is telescoped over the axle 304 at its end, which is remote from the bearing 308. The bearing pulling members 258 and 260 are then placed about the housing 306 with the flanges 262 engaged against the under side of the housing 306 remote from the housing 244. The members 258 and 260 are then attached together by the bolts 284 and 286. The members 258 and 260 are next attached to the member 254 by the bolts 264 and 266. This results in the member 254 fitting against the enlarged shoulder 252 of the annular member 250 and the flanges 262 being in contact with the housing plate 306.

Relative movement between the axle 304 and the hollow housing 244 is created by moving the threaded shaft 290 through grasping the enlarged nut 292 by a suitable tool. This results in removal of the housing 306 and the bearing 308 from the axle 304.

FIGURE 25 shows an inner race 310 of a Corvair bearing remaining on a rear axle 312 after the bearing has been pulled from the axle 312. This results from the outer race being separated from the inner race during the removal operation or prior thereto.

When this occurs, the bearing puller of FIGURE 20 may be employed to remove the inner race 310 from the axle 312. However, because the opening, defined by the flanges 262 of the members 258 and 260, is greater than the inner race 310, it is necessary to use an annular insert 314 with a depending flange 316 defining substantially the same diameter as the axle 312. The annular insert 314 is formed of two separate like segments to permit positioning of the insert 314 about the inner race 310. The remainder of the operation of pulling the inner race 310 from the axle 312 is the same as described previously for the bearing puller of FIGURE 20.

It will be understood that the device shown in FIGURES 20–26 may be used in connection with an arbor press such as shown in FIGURE 15 by removing members 244, 250, 254, 272 and by placing the face 260a upon the upper surface of the press member 214 with the axle 296 projecting upwardly.

An advantage of this invention is that bearings on rear axles of automobiles may be readily removed either in a portable operation or by a press. Another advantage of this invention is that it permits bearings to be readily pulled by one person in a small shop.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A device for pulling bearings and the like from an axle comprising an elongated hollow housing having a pair of opposed open ends, an annular member removably connected to one of said open ends of said housing, said annular member having a shoulder on one end of greater periphery than the periphery of said annular member, a pair of bearing pulling members, means connecting said pulling members to said annular member to interconnect said pulling members to said housing (said connecting means including a flange member disposed on the side of said shoulder remote from said pulling members and means connecting said pulling members to said flange member), said pulling members being spaced from said housing, and said pulling members having cooperating flanges to engage a bearing disposed between said pulling members and said annular member of said housing.

2. A device for pulling bearings and the like from an axle comprising an elongated hollow housing having a pair of opposed open ends, an annular member removably connected to one of said open ends of said housing, said annular member having a shoulder of greater periphery than the periphery of said annular member, a pair of bearing pulling members, means connecting said pulling members to said annular member to interconnect said pulling members to said housing, said pulling members being spaced from said housing, and said pulling members having cooperating flanges to engage a bearing disposed between said pulling members and said annular member of said housing and an annular adapter operatively connected with said pulling members and the bearing to center the bearing and said pulling members with respect to each other.

3. A device for pulling bearings and the like from an axle comprising an elongated hollow housing having a pair of opposed open ends, an annular member removably connected to one of said open ends of said housing, said annular member having a shoulder with a greater periphery than the periphery of said annular member, a pair of bearing pulling members, means connecting said pulling members to said annular member to interconnect said pulling members to said housing, said pulling members being spaced from said housing, said pulling members having cooperating flanges, an annular adapter operatively connected with said pulling members and an inner race of a bearing, said annular adapter resting against said cooperating flanges, said annular adapter having a flange defining a smaller diameter than the diameter defined by said cooperating flanges, said flange of said annular adapter engaging the inner race of the bearing, and said pulling members encompassing said annular adapter.

References Cited

UNITED STATES PATENTS

| | | | |
|---|---|---|---|
| 1,585,707 | 5/1926 | Hartsock | 29—263 |
| 2,352,739 | 7/1944 | Sauer | 29—263 |
| 2,377,973 | 6/1945 | Scott | 29—263 |
| 2,614,318 | 10/1952 | McCord | 29—263 |
| 3,103,064 | 9/1963 | Hawkins | 29—252 |

MYRON C. KRUSE, *Primary Examiner.*